(12) United States Patent
Kim et al.

(10) Patent No.: US 11,781,566 B1
(45) Date of Patent: Oct. 10, 2023

(54) WATER PUMP AND MANUFACTURING METHOD THEREOF

(71) Applicant: COAVIS, Sejong-si (KR)

(72) Inventors: Joonseup Kim, Sejong-si (KR);
Wansung Pae, Sejong-si (KR);
Hyuntae Lee, Sejong-si (KR);
Wookeun Lee, Sejong-si (KR);
Yonghwa Hong, Sejong-si (KR)

(73) Assignee: COAVIS, Sejong-si (KR)

( * ) Notice: Subject to any disclaimer, the term of this patent is extended or adjusted under 35 U.S.C. 154(b) by 0 days.

(21) Appl. No.: 18/058,670

(22) Filed: Nov. 23, 2022

(51) Int. Cl.
| | |
|---|---|
| *F04D 29/02* | (2006.01) |
| *F04D 29/42* | (2006.01) |
| *F04D 29/62* | (2006.01) |
| *F04D 13/06* | (2006.01) |
| *B29C 65/16* | (2006.01) |

(52) U.S. Cl.
CPC ....... *F04D 29/628* (2013.01); *F04D 13/0613* (2013.01); *F04D 29/026* (2013.01); *F04D 29/426* (2013.01); *B29C 65/1635* (2013.01); *F05D 2210/11* (2013.01); *F05D 2230/234* (2013.01); *F05D 2250/712* (2013.01)

(58) Field of Classification Search
CPC .... F04D 29/026; F04D 29/426; F04D 29/628; F04D 13/06; F04D 13/0613; B29C 66/73921; B29C 65/1635; B29C 65/1667; F05D 2230/234
See application file for complete search history.

(56) References Cited

U.S. PATENT DOCUMENTS

| | | | | |
|---|---|---|---|---|
| 8,002,522 | B2 * | 8/2011 | Ihle | B29C 65/1635 |
| | | | | 415/206 |
| 10,393,120 | B2 * | 8/2019 | Reul | F04D 29/22 |
| 10,851,802 | B2 * | 12/2020 | Furukawa | A61M 60/818 |
| 2004/0062664 | A1 * | 4/2004 | Weigold | F04D 13/064 |
| | | | | 417/357 |
| 2022/0205455 | A1 * | 6/2022 | Qin | F04D 29/426 |

FOREIGN PATENT DOCUMENTS

| | | | | |
|---|---|---|---|---|
| DE | 102010029978 A1 * | 12/2011 | .......... | F04D 29/086 |
| FR | 3022596 A1 * | 12/2015 | ......... | B29C 65/1616 |
| KR | 102178862 B1 | 11/2020 | | |

* cited by examiner

*Primary Examiner* — Justin D Seabe
(74) *Attorney, Agent, or Firm* — McCoy Russell LLP (57) ABSTRACT

Provided is a water pump which may be easily manufactured and a manufacturing method thereof, the water pump including: a motor housing having a concave container shape; a lower casing including a first side wall protruding downward for a lower end of the first side wall to be in contact with an upper end of the motor housing; and an upper casing fitted to the outside of the lower casing, and including a second side wall protruding downward for a lower end of the second side wall to be in contact with the upper end of the motor housing, wherein the upper end of the motor housing, the lower end of the first side wall, and the lower end of the second side wall are simultaneously fusion-coupled with one another.

12 Claims, 11 Drawing Sheets

Prior Art

WATER PUMP AND MANUFACTURING METHOD THEREOF

TECHNICAL FIELD

The following disclosure relates to a water pump which may pump cooling water by rotating an impeller, and a manufacturing method thereof.

BACKGROUND

A water pump is a device for circulating cooling water to an engine or a heater for engine cooling or interior heating. This water pump may be roughly classified into a mechanical water pump and an electric water pump.

The mechanical water pump is a pump connected to a crankshaft of the engine and driven by rotation of the crankshaft, and the electric water pump is a pump driven by rotation of a motor controlled by a control device.

The electric water pump may roughly include a motor part including a housing, a stator and a rotor, and a pump part including an impeller and an impeller casing. In addition, the stator may be positioned in and fixed to the housing, the rotor may be disposed in the stator while being spaced apart therefrom, the impeller may be coupled to a rotating shaft of the rotor, and the impeller casing may be coupled to the housing to cover and block the impeller.

Figure 1:
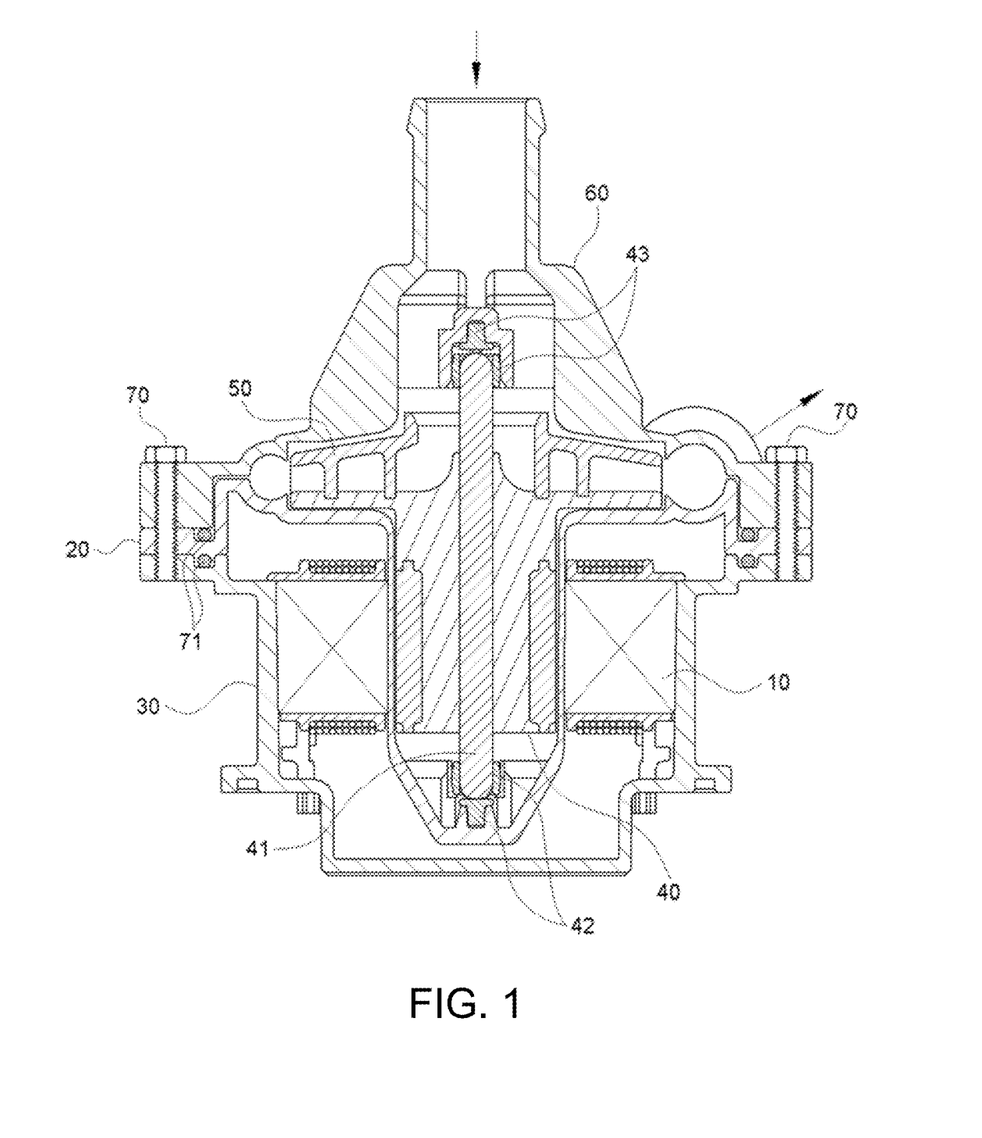
FIG. 1 is a front cross-sectional view showing an example of a prior water pump.

FIG. 1 is a front cross-sectional view showing an example of a prior electric water pump.

As shown in the drawing, the prior electric water pump may roughly include a motor housing 30, a stator 10, a lower casing 20, an upper casing 60, an impeller 50, and a rotor 40. The motor housing 30 may have a shape of a concave container with an open upper side, the stator 10 may be inserted into the motor housing 30, the lower casing 20 may be coupled to an upper side of the motor housing 30, a rotor accommodating part 21 of the lower casing 20 may thus be inserted through a hollow interior of the stator 10. In addition, the rotor 40 may be inserted into the rotor accommodating part 21, the impeller 50 may be disposed on an upper side of the rotor 40, and the rotor 40 and the impeller 50 are integrally coupled with each other. In addition, the upper casing 60 may be coupled to an upper side of the lower casing 20, and the impeller 50 may be disposed in an impeller accommodating space, which is an internal space formed by the coupling of the lower casing 20 and the upper casing 60. In addition, a lower end of the rotating shaft 41 of the rotor 40 may be rotatably coupled to a lower bearing 42 and an upper end of the rotating shaft 41 may be rotatably coupled to an upper bearing 43.

Here, the prior electric water pump may include a sealing member 71 such as an O-ring, interposed between the components to maintain airtightness therebetween when the upper casing 60, the lower casing 20, and the motor housing 30 are assembled with one another, and a rim portion fixed by using a fastening member 70 such as a bolt for sealing and fixing the components.

However, the prior electric water pump employing this structure may fail to maintain the airtightness when the O-ring interposed between the upper casing 60 and the lower casing 20 or between the lower casing 20 and the motor housing 30 is deviated or partially chewed during the assembly.

RELATED ART DOCUMENT

[Patent Document]

KR 10-2178862 B1 (Nov. 9, 2020) entitled, "Electric water pump"

SUMMARY

Embodiments of the present disclosure are directed to providing a water pump which may ensure reliable airtightness at a coupling portion when an upper casing, a lower casing, and a motor housing are assembled and coupled with one another, and a manufacturing method thereof.

In one general aspect, a water pump includes: a motor housing having a shape of a container with an open upper side; a lower casing disposed on the upper side of the motor housing, and including a rotor accommodating part that protrudes downward and has a rotor accommodating space concave downward from an upper surface thereof, and a first side wall protruding downward along a circumference thereof for a lower end of the first side wall to be in contact with an upper end of the motor housing; and an upper casing disposed on an upper side of the lower casing to be fitted to the outside of the lower casing, having an impeller accommodating space formed therein together with the lower casing, and including a second side wall protruding downward along a circumference thereof for a lower end of the second side wall to be in contact with the upper end of the motor housing, wherein the upper end of the motor housing, the lower end of the first side wall, and the lower end of the second side wall are fusion-coupled with one another.

The motor housing may have a concave insertion groove positioned along a circumference of the upper end, and the lower end of the first side wall and the lower end of the second side wall may be inserted into the insertion groove.

The motor housing may be made of a laser-transmitting material, and the lower casing or the upper casing may be made of a laser-absorbing material.

The lower end of the first side wall and the lower end of the second side wall may be disposed adjacent to each other in a radial direction, and a lower surface of the first side wall and a lower surface of the second side wall may be in contact with a bottom surface of the insertion groove.

The lower surface of the first side wall and the lower surface of the second side wall may be disposed at the same height as each other in a central axis direction.

A predetermined gap may exist between the first side wall and the insertion groove, or between the second side wall and the insertion groove, in the radial direction.

A lower surface of the second side wall may be disposed higher than a lower surface of the first side wall in a central axis direction, the lower end of the second side wall may be disposed adjacent to the first side wall, and the insertion groove may have a shape corresponding to those of the lower end of the first side wall and the lower end of the second side wall.

The lower surface of the second side wall may be in contact with a bottom surface of the insertion groove.

The lower surface of the second side wall may be inclined outward and upward in a radial direction.

The lower end of the first side wall, the lower end of the second side wall, and the bottom surface of the insertion groove may be all fusion-coupled with one another at their adjacent portions.

The pump may further include: a stator positioned in the motor housing; an impeller rotatably positioned in the impeller accommodating space; and a rotor rotatably positioned in the rotor accommodating space of the lower casing and coupled to the impeller to be rotated together.

In another general aspect, a manufacturing method of the water pump includes: a part preparation operation of manufacturing the motor housing with a laser-transmitting material, and manufacturing the lower casing and the upper casing with a laser-absorbing material; a part assembly operation of assembling the motor housing, the stator, the lower casing, the rotor, the impeller, and the upper casing with one another; and a laser fusion operation of irradiating a laser beam to the lower end of the first side wall and the lower end of the second side wall for the laser beam to pass through the insertion groove, thereby fusion-coupling the upper end of the motor housing, the lower end of the first side wall, and the lower end of the second side wall with one another.

The lower end of the first side wall, the lower end of the second side wall, and the upper end of the motor housing may be coupled with one another simultaneously by the laser fusion.

The lower end of the first side wall, the lower end of the second side wall, and an upper surface of the motor housing may be all fusion-coupled with one another at their adjacent portions.

The lower end of the first side wall and the lower end of the second side wall may respectively be fused with the upper surface of the motor housing, and the first side wall and the second side wall may be simultaneously fused with the upper surface of the motor housing.

The lower end of the first side wall and the lower end of the second side wall may be simultaneously fused with the upper surface of the motor housing at their points spaced apart from each other in a circumferential direction.

In the laser fusion operation, the laser beam may be irradiated in a central axis direction or to be inclined with respect to a central axis.

Other features and aspects will be apparent from the following detailed description, the drawings, and the claims.

DETAILED DESCRIPTION OF EMBODIMENTS

Hereinafter, a water pump and a manufacturing method thereof according to the present disclosure are described in detail with reference to the accompanying drawings.

<Water Pump According to First Embodiment>

Figure 2:
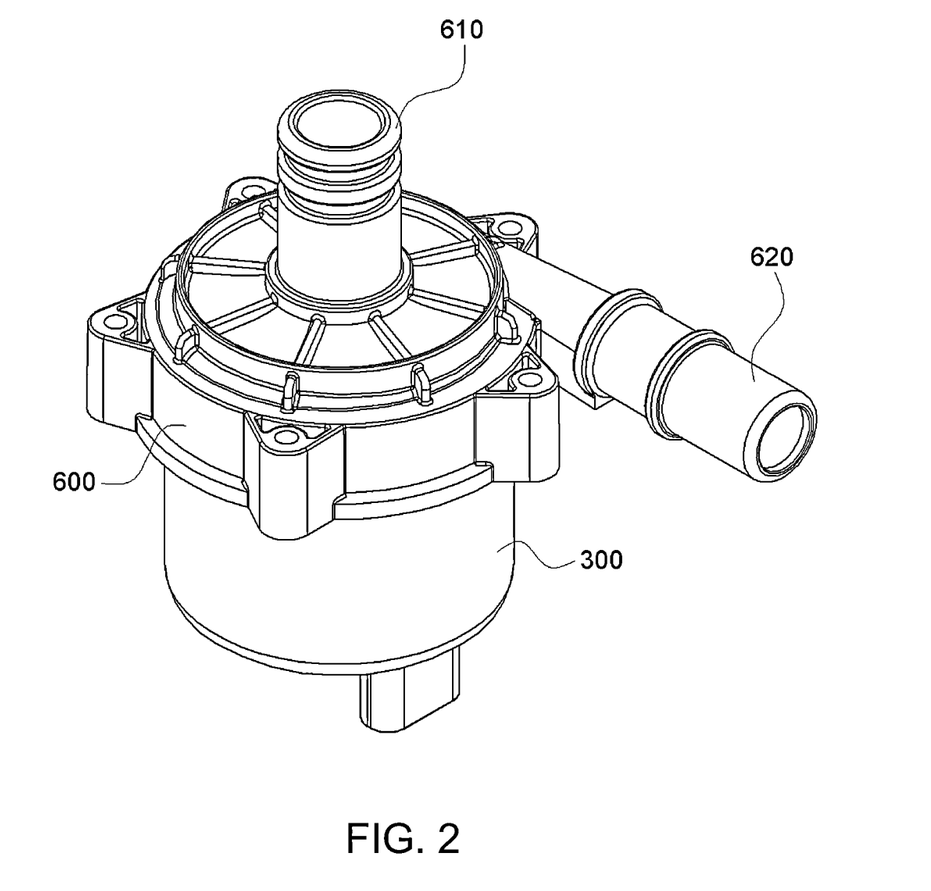
FIGS. 2 to 4 are an assembled perspective view, an exploded perspective view, and a front cross-sectional view showing a water pump according to a first embodiment of the present disclosure, respectively.
Figure 3:
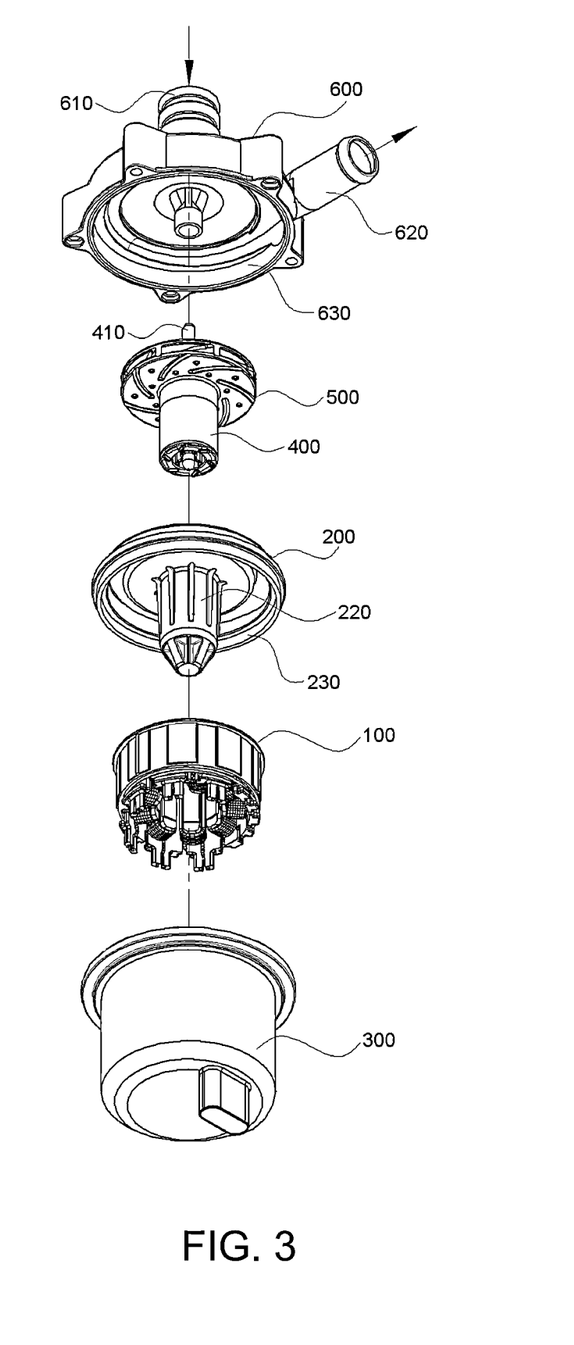
Figure 4:
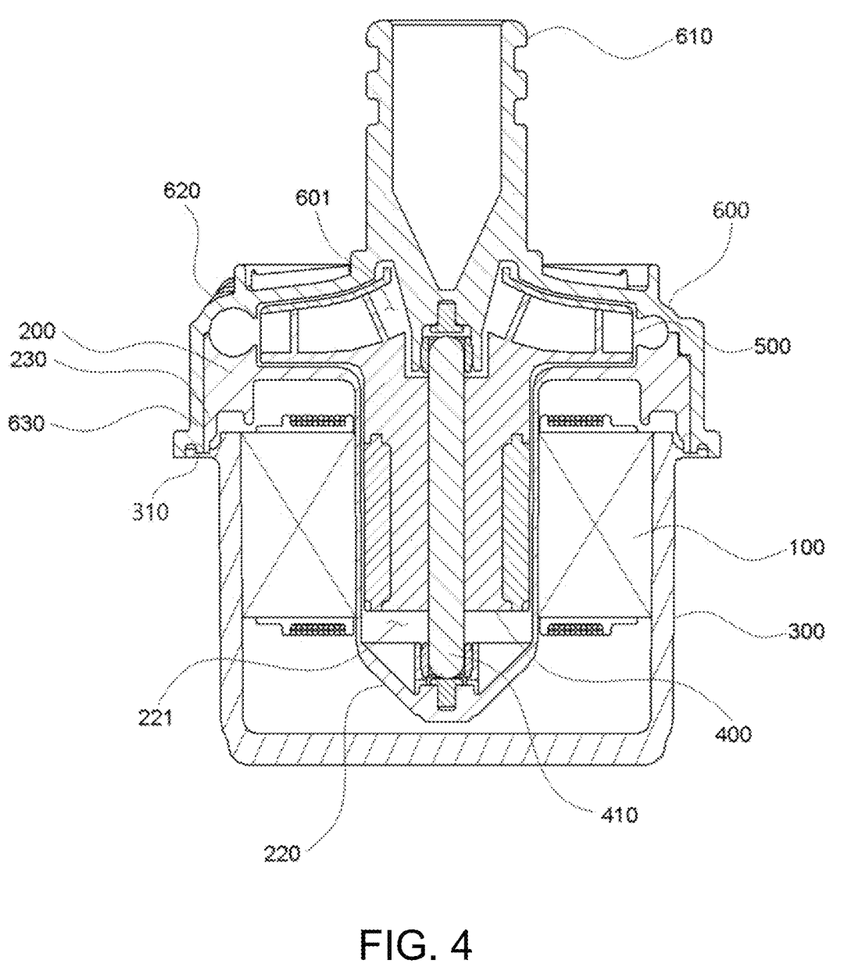
Figure 5:
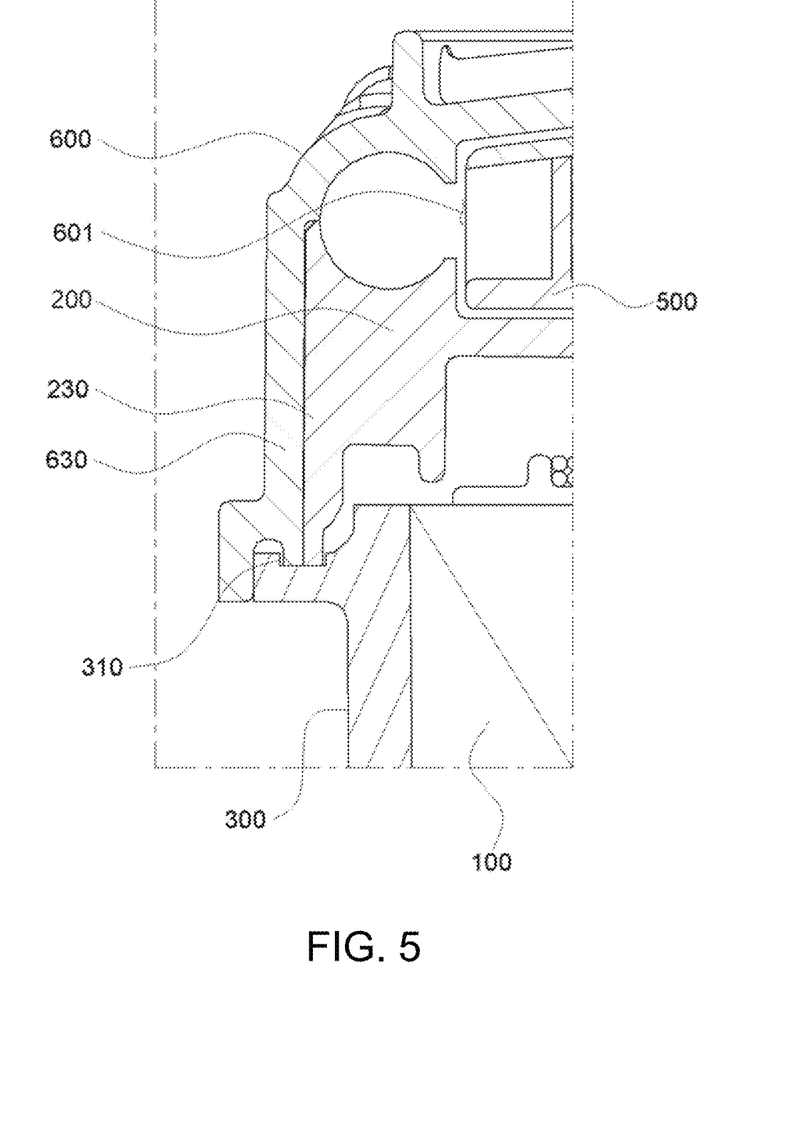
FIG. 5 is a partial cross-sectional view showing a state where a motor housing, lower casing, and upper casing of the water pump according to the first embodiment of the present disclosure are assembled with one another before being fused.

FIGS. 2 to 4 are an assembled perspective view, an exploded perspective view, and a front cross-sectional view showing a water pump according to the first embodiment of the present disclosure, respectively; and FIG. 5 is a partial cross-sectional view showing a state where a motor housing, lower casing, and upper casing of the water pump according to the first embodiment of the present disclosure are assembled with one another before being fused.

As shown in the drawings, the water pump according to the first embodiment of present disclosure may roughly include a motor housing 300, a lower casing 200 and an upper casing 600, and may further include a stator 100, an impeller 500, and a rotor 400.

The motor housing 300 may have a shape of a concave container to accommodate the stator 100 therein, an empty inside, and an open upper side. The motor housing 300 may also have a blocked side and a blocked lower end, the side having a cylindrical shape, and a flange may protrude outward from an outer circumferential surface of an upper end of a side wall in a radial direction and be positioned continuously around an entire circumference. In addition, the motor housing 300 may have an insertion groove 310 concave downward from an upper surface of the flange, and the insertion groove 310 may be positioned continuously along the entire circumference in a circumferential direction.

The lower casing 200 may have a lower settling groove concave downward from an upper surface of an upper plate thereof to accommodate a portion of the impeller 500, and a concave lower passage groove positioned outside the lower settling groove in a radial direction for a fluid discharged from the impeller 500 to flow. In addition, the lower casing 200 may have a rotor accommodating part 220 protruding downward from its center, and the rotor accommodating part 220 may have a shape of a container that is concave downward from its upper side to accommodate the rotor 400 therein. In addition, the rotor accommodating part 220 may include a lower bearing mounting part positioned at a lower end of a rotor accommodating space 221, which is a concave interior, a lower bearing may be mounted on the lower bearing mounting part, and a lower end of a rotating shaft 410 of the rotor 400 may be coupled to the lower bearing. In addition, the rotor accommodating part 220 may be integrally formed with the upper plate of the lower casing 200 by injection molding. In addition, the rotor accommodating part 220 of the lower casing 200 may be inserted into a hollow inside of the stator 100, and an outer circumferential surface of the rotor accommodating part 220 may be contact-coupled to an inner circumferential surface of the stator 100. In addition, the lower casing 200 may have a first side wall 230 protruding downward along a circumference of the upper plate, and a lower end of the first side wall 230 may be inserted into the insertion groove 310 of the motor housing.

The upper casing 600 may be coupled to an upper side of the lower casing 200, and have an impeller accommodating space 601 accommodating the impeller 500 formed between the upper casing 600 and the lower casing 200 by coupling the upper casing 600 and the lower casing 200 with each other. In addition, an upper seating groove concave upward may be positioned in a lower surface of the upper casing 600 to accommodate a portion of the impeller 500, and the lower settling groove and the upper seating groove may thus form the impeller accommodating space 601. In addition, the concave upper passage groove may be positioned to correspond to the lower passage groove of the lower casing 200 in the lower surface of the upper casing 600 for the fluid discharged from the impeller 500 to flow. In addition, the upper casing 600 may have an inlet part 610 through which the fluid flows that is positioned in its center, and an outlet part 620 through which the fluid is discharged that is positioned at a circumferential portion, in which both the inlet part 610 and the outlet part 620 may communicate with the impeller accommodating space 601. In addition, the upper casing 600 may have an upper bearing mounting part, an upper bearing may be coupled to the upper bearing mounting part, and an upper end of the rotating shaft 410 of the rotor 400 may be coupled to the upper bearing. Here, the upper casing 600 may have a second side wall 630 protruding downward along a circumference thereof, the second side wall 630 may be inserted into the insertion groove 310 of the motor housing 300, and the upper casing 600 may be fitted to the outside of the lower casing 200. That is, the second side wall 630 of the upper casing 600 may be disposed outward than the first side wall 230 of the lower casing 200 in the radial direction.

The stator 100 may have an overall shape of a substantial cylinder, and be accommodated in the motor housing 300. The stator 100 may be a stator of a general motor, and have various shapes and structures. In addition, the stator 100 may be coupled and fixed to the motor housing 300 in a state where an outer circumferential surface thereof is in contact with an inner circumferential surface of the motor housing 300.

The rotor 400 may be accommodated in the rotor accommodating space 221 of the lower casing 200, and rotated while an outer circumferential surface of the rotor 400 is spaced apart from an inner circumferential surface of the rotor accommodating part 220. In addition, the rotor 400 may be a rotor of the general motor, and have various shapes and structures.

The impeller 500 may serve to pump the fluid introduced through the inlet part 610 of the upper casing 600 toward the outlet part 620 by its rotation, and the impeller 500 may be accommodated in the impeller accommodating space 601 between the lower casing 200 and the upper casing 600. In addition, the impeller 500 may be a centrifugal impeller in which the fluid is introduced in a central axis direction and discharged outward in the radial direction, and the impeller 500 may have various shapes. In addition, the impeller 500 may be manufactured separately from the rotor 400 and then coupled thereto. Alternatively, as shown in the drawings, the impeller 500 and the rotor 400 may be integrally formed with each other. Here, some parts of the impeller 500 may be integrally formed with the rotor 400 and the other parts of the impeller 500 may be separately formed from the rotor 400 and then assembled thereto.

Therefore, assembly of the water pump may be completed in the following manner the stator 100 may be inserted into the motor housing 300, and in this state, the lower casing 200 covers the upper side of the motor housing 300 to be assembled thereto, the rotor 400 and the impeller 500 are then assembled to the lower casing 200, and the upper casing 600 then covers the upper side of the lower casing to be assembled thereto.

Figure 6:
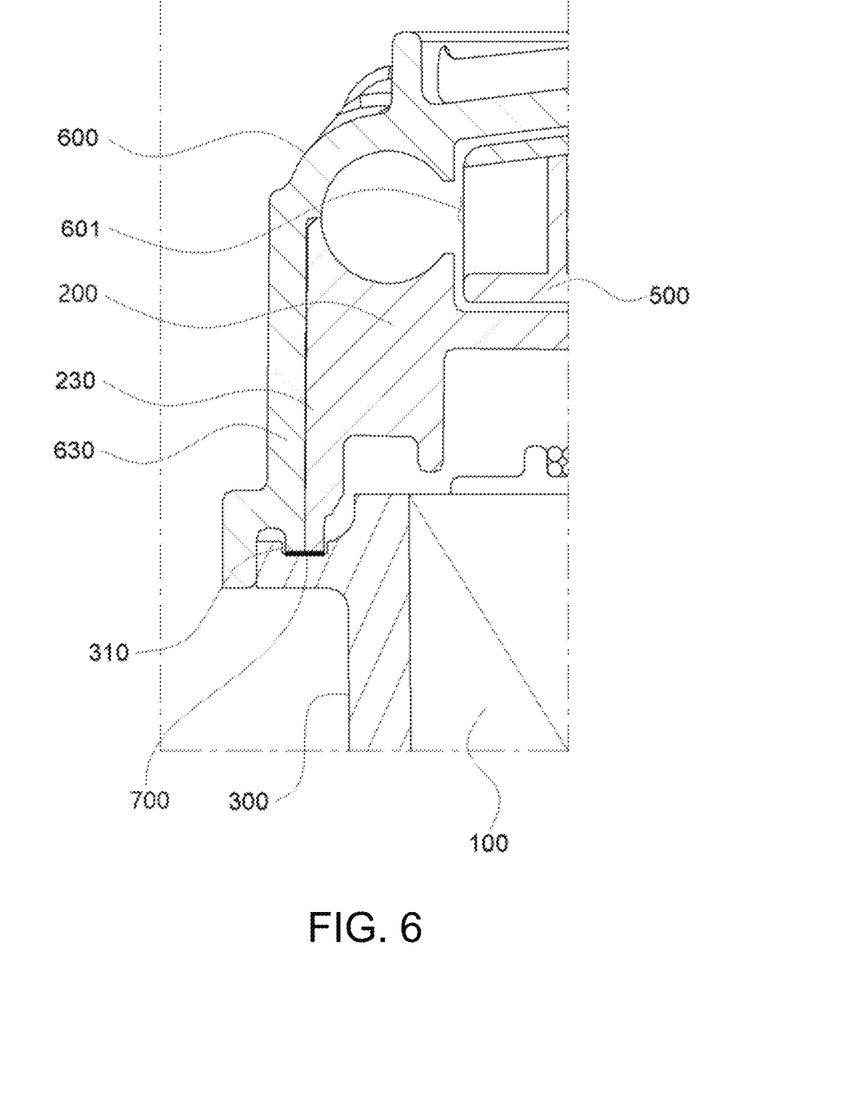
FIG. 6 is a partial cross-sectional view showing a state where the motor housing, lower casing, and upper casing of the water pump according to the first embodiment of the present disclosure are fusion-coupled with one another.

FIG. 6 is a partial cross-sectional view showing a state where the motor housing, lower casing, and upper casing of the water pump according to the first embodiment of the present disclosure are fusion-coupled with one another.

After the assembly of the water pump is completed, as shown in the drawing, a fused part 700 may be formed by simultaneously fusion-coupling the insertion groove 310 positioned in the upper end of the motor housing 300, the lower end of the first side wall 230, and a lower end of the second side wall 630. It is thus possible to ensure reliable airtightness at a coupling portion of the three parts and easier manufacturing of the water pump. Here, various fusion methods may be used for the fusion.

In addition, the motor housing 300 may be made of a laser-transmitting plastic material, and the lower casing 200 or the upper casing 600 may be made of a laser-absorbing plastic material. The insertion groove 310, the lower end of the first side wall 230, and the lower end of the second side wall 630 may thus be coupled with one another by laser fusion. Here, the motor housing 300 may be made of a transparent material having a laser transmittance of about 40% or more, and the lower casing 200 or the upper casing 600 may be made of an opaque material so that the laser beam is absorbed thereto without passing through the casing, and their portions to which the laser beam is irradiated may be melted and fused. Therefore, when the laser beam passes through the insertion groove 310 and irradiates the lower end of the first side wall 230 and the lower end of the second side wall 630, the lower end of the first side wall 230 and the lower end of the second side wall 630 may absorb the laser beam to be melted. Here, a bottom surface of the insertion groove 310 in contact with these ends may be melted together to complete their fusion.

In addition, the lower end of the first side wall 230 and the lower end of the second side wall 630 may be disposed adjacent to each other in the radial direction, and a lower surface of the first side wall 230 and a lower surface of the second side wall 630 may be in contact with the bottom surface of the insertion groove 310. The three parts may thus be fused simultaneously by the laser fusion, i.e. by irradiating a laser beam to the coupling portion of the three parts, thereby ensuring the reliable airtightness at the fused part.

In addition, the lower surface of the first side wall 230 and the lower surface of the second side wall 630 may be disposed at the same height as each other in the central axis direction. Accordingly, during the laser fusion, the lower surface of the first side wall 230, the lower surface of the second side wall 630, and the bottom surface of the insertion groove 310 may be uniformly fused with one another.

In addition, a predetermined gap may exist between the first side wall 230 and the insertion groove 310 in the radial direction, and a predetermined gap may also exist between the second side wall 630 and the insertion groove 310 in the radial direction. In addition, a predetermined gap may exist between the first side wall 230 and the second side wall 630. Here, a melted resin may be pushed out through the gap during the fusion as the fusion is performed in a state where the upper side of the upper casing 600 and the lower side of the motor housing 300 are pressed. The fused part may thus have an increased coupling force.

<Water Pump According to Second Embodiment>

Figure 7:
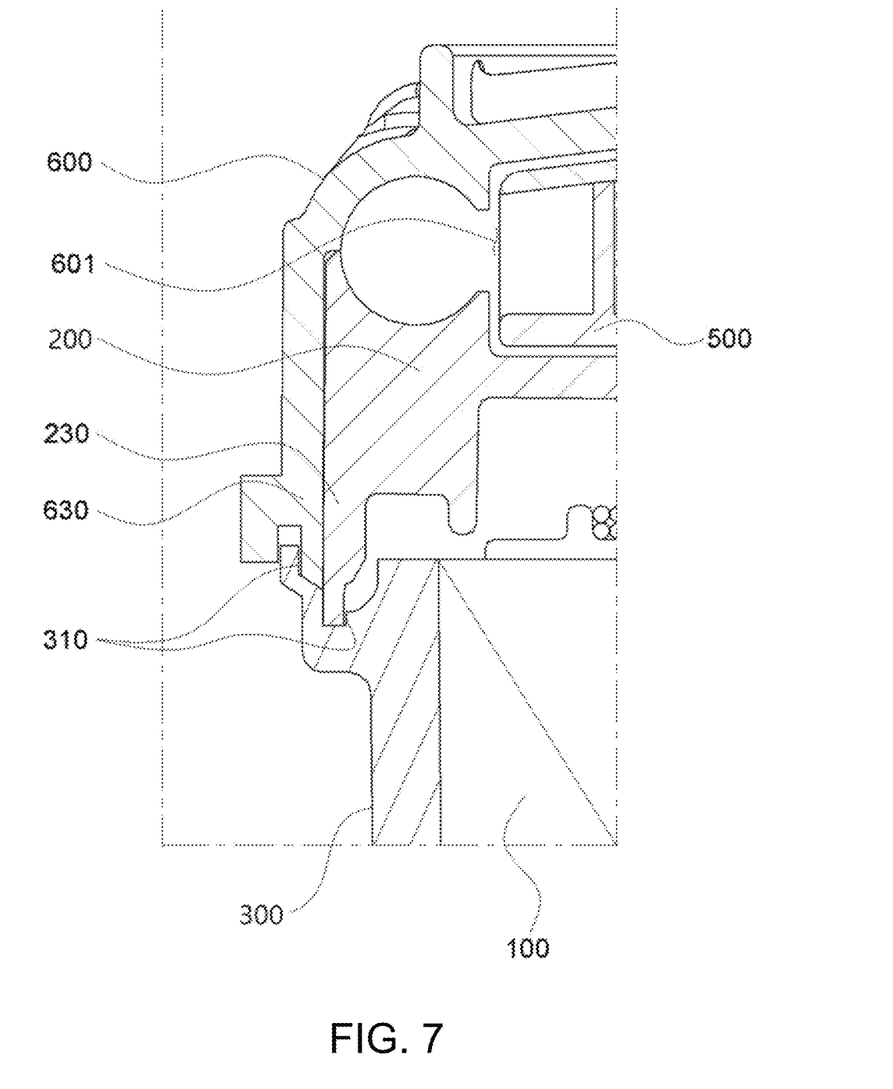
FIG. 7 is a partial cross-sectional view showing a state where the motor housing, lower casing, and upper casing of a water pump according to a second embodiment of the present disclosure are assembled with one another before being fused.
Figure 8:
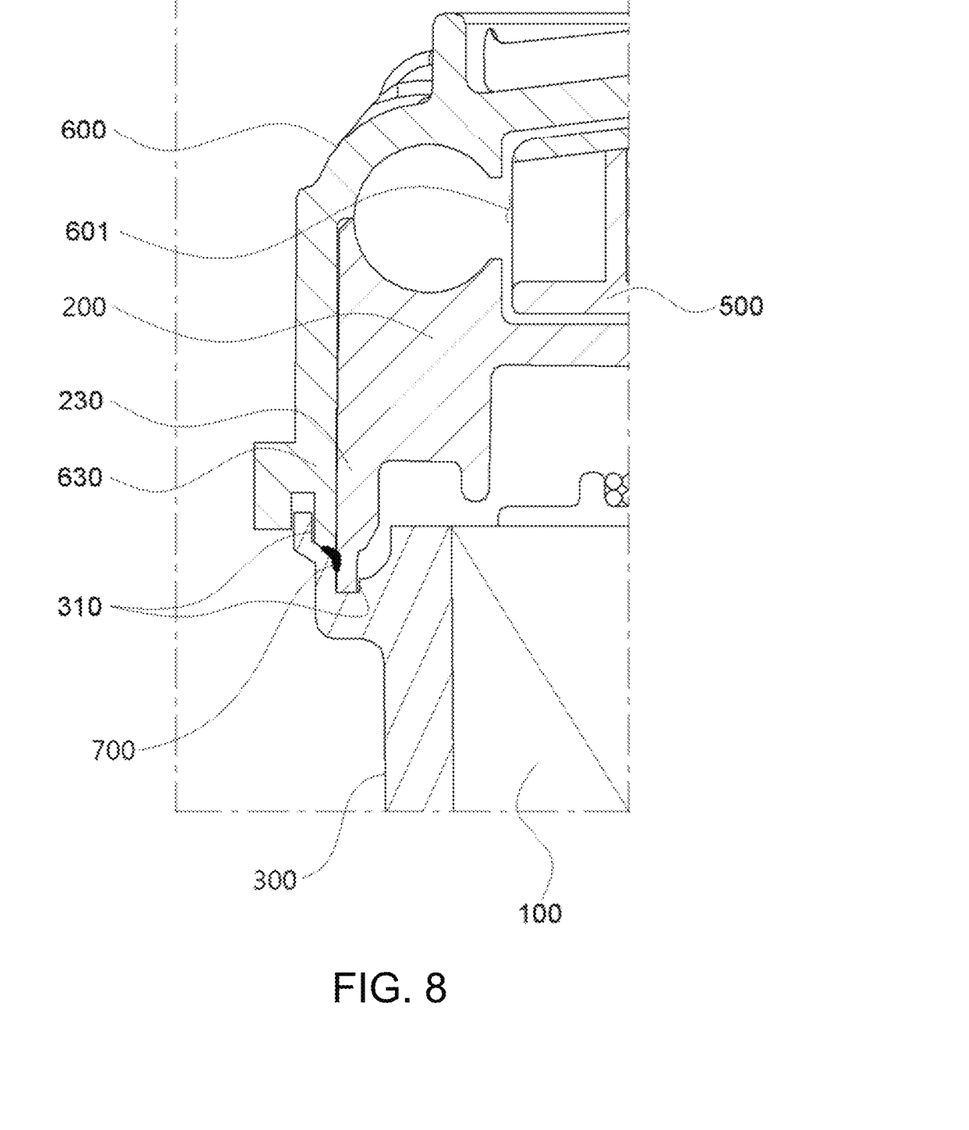
FIG. 8 is a partial cross-sectional view showing a state where the motor housing, lower casing, and upper casing of the water pump according to the second embodiment of the present disclosure are fusion-coupled with one another.

FIG. 7 is a partial cross-sectional view showing a state where the motor housing, lower casing, and upper casing of a water pump according to the second embodiment of the present disclosure are assembled with one another before being fused; and FIG. 8 is a partial cross-sectional view showing a state where the motor housing, lower casing, and upper casing of the water pump according to the second embodiment of the present disclosure are fusion-coupled with one another.

As shown in FIG. 7, the water pump according to the second embodiment of the present disclosure only has different shapes of the lower end of the second side wall 630 of the upper casing 600 and the insertion groove 310 of the motor housing 300 from the first embodiment, and the rest of the components are the same as those of the first embodiment.

In the water pump according to the second embodiment of the present disclosure, the lower surface of the second side wall 630 may be disposed higher than the lower surface of the first side wall 230 in the central axis direction of the water pump, the lower end of the second side wall 630 may be disposed adjacent to the first side wall 230, and the insertion groove 310 may have a shape corresponding to those of the lower end of the first side wall 230 and the lower end of the second side wall 630. In addition, the lower surface of the second side wall 630 and the lower surface of the first side wall 230 may respectively come into contact with facing surfaces of the corresponding insertion grooves 310. In addition, the motor housing 300 of the water pump according to the second embodiment of the present disclosure may be made of the laser-transmitting plastic material, and the lower casing 200 or the upper casing 600 may be made of the laser-absorbing plastic material. The insertion groove 310, the lower end of the first side wall 230, and the lower end of the second side wall 630 may thus be coupled with one another by the laser fusion.

The three parts may thus be fused simultaneously by the laser fusion, i.e. by irradiating the coupling portion of the three parts with the laser beam. In this way, the fused part 700 may be formed as shown in FIG. 8 to thus ensure the reliable airtightness at the fused part. In addition, the fusion may be performed by irradiating the laser beam from a side of the corresponding part during the laser fusion, and a fusion process may be easily performed without interference between a product and fusion equipment.

In addition, the lower surface of the second side wall 630 may be inclined outward and upward in the radial direction. Therefore, during the laser fusion, the fusion may be performed by irradiating the laser beam to be inclined at an acute angle with respect to a central axis of the water pump, thereby achieving more reliable fusion and securing a wider fused area, resulting in the increased coupling force.

In addition, the lower end of the first side wall 230, the lower end of the second side wall 630, and the bottom surface of the insertion groove 301 may be all fusion-coupled with one another at their adjacent portions. The three parts may thus be fused simultaneously by the laser fusion, i.e. by irradiating the laser beam to the coupling portion of the three parts, thereby ensuring the reliable airtightness at the fused part.

<Manufacturing Method of Water Pump>

Figure 9:
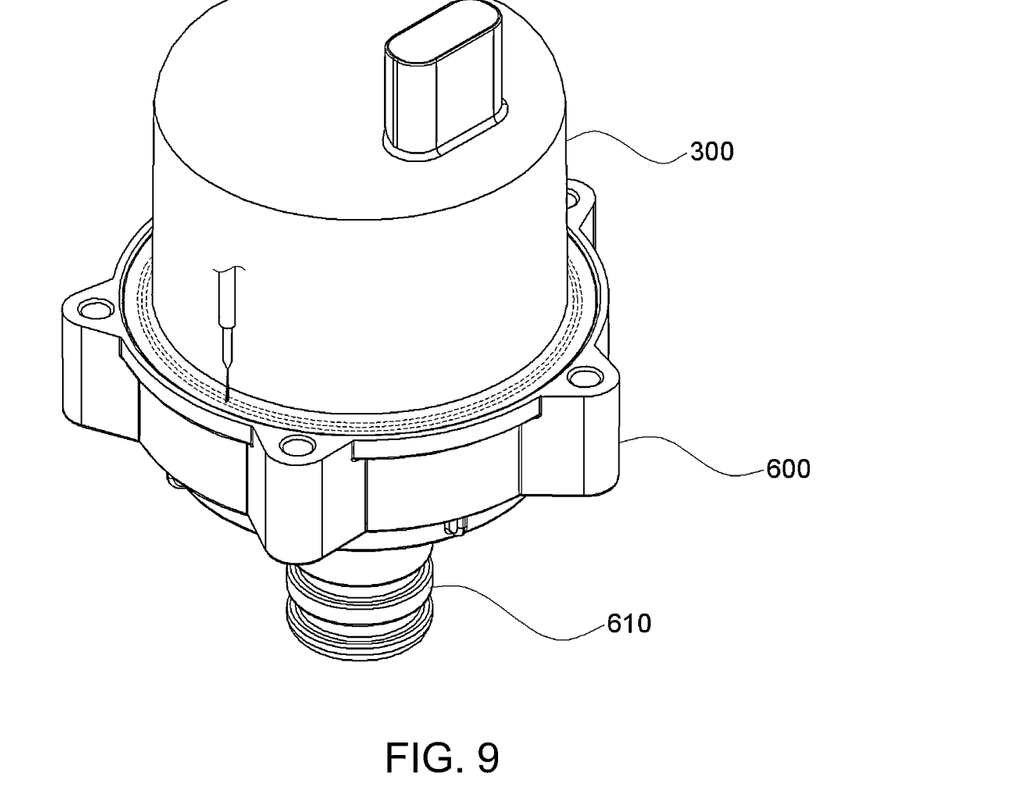
FIGS. 9 to 11 are views respectively showing embodiments in which a motor housing, a lower casing, and an upper casing are fused with one another by laser fusion in a manufacturing method of a water pump according to the present disclosure.
Figure 10:
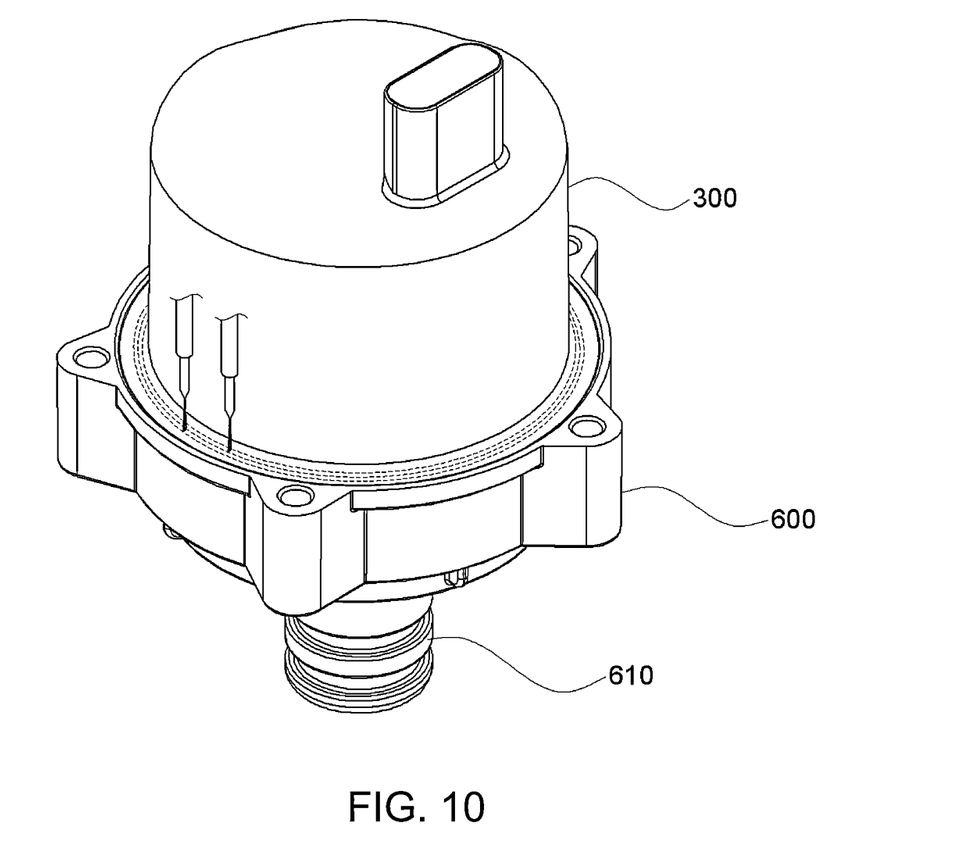
Figure 11:
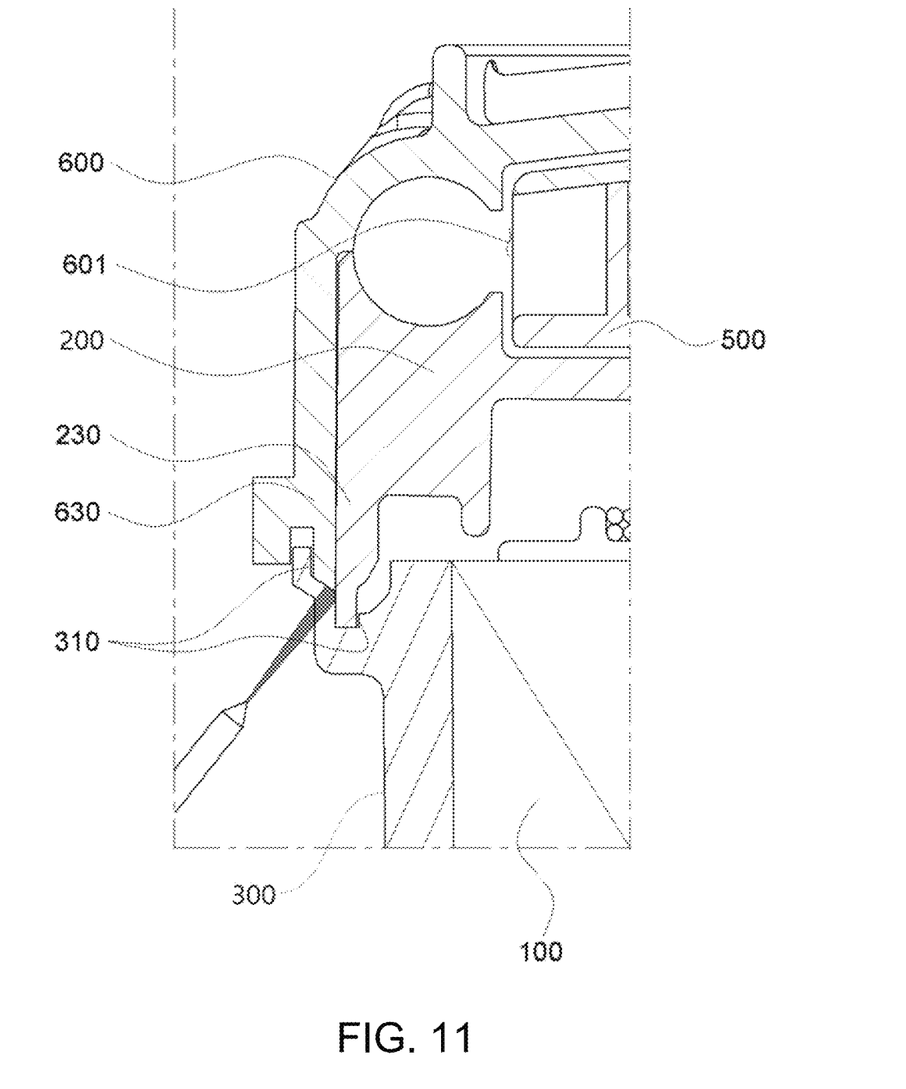

FIGS. 9 to 11 are views respectively showing embodiments in which a motor housing, a lower casing, and an upper casing are fused with one another by laser fusion in a manufacturing method of a water pump according to the present disclosure.

In the manufacturing method of a water pump according to the present disclosure, as described above, the motor housing 300 may be made of a laser-transmitting plastic material, the lower casing 200 or the upper casing 600 may be made of a laser-absorbing plastic material, and the remaining parts such as the stator 100, the rotor 400, and the impeller 500 may be prepared. Next, the prepared parts may be assembled with one another, the water pump may then be turned over so that the motor housing 300 is positioned on the upper side of the pump and the upper casing 600 is positioned on the lower side of the pump, and the motor housing 300 and the upper casing 600 may then be pressed in their stacking direction. Next, a laser beam may be irradiated from the upper side of the insertion groove 310 to the lower end of the first side wall 230 and the lower end of the second side wall 630 to pass through the insertion groove 310 in this state, thereby fusion-coupling the insertion groove 310, the lower end of the first side wall 230, and the lower end of the second side wall 630 with one another.

In addition, the lower end of the first side wall 230, the lower end of the second side wall 630, and the bottom surface of the insertion groove 310 may be coupled with one another simultaneously by the laser fusion.

Here, as shown in FIG. 9, the fusion may be performed as the laser beam is irradiated to the part where the lower end of the first side wall 230, the lower end of the second side wall 630, and the bottom surface of the insertion groove 310 are all adjacent to one another by using a single laser beam irradiator by being rotated one turn in a circumferential direction, and the three parts may thus be all fused with one another simultaneously by one-time fusion.

In addition, the lower end of the first side wall 230 and the lower end of the second side wall 630 may respectively be fused with the bottom surface of the insertion groove 310, and the first side wall 230 and the second side wall 630 may be simultaneously fused with the bottom surface of the insertion groove 310. That is, two laser beam irradiators may be used to simultaneously fuse the first side wall 230 and the second side wall 630 with the insertion groove 310, respectively.

Here, as shown in FIG. 10, the lower end of the first side wall 230 and the lower end of the second side wall 630 may be simultaneously fused with the bottom surface of the insertion groove 310 at their points spaced apart from each other in the circumferential direction. That is, the two laser beam irradiators may be disposed to be spaced apart from each other in the radial direction and spaced apart from each other in the circumferential direction as well, and the fusion may be simultaneously performed at two points without any interference between the two laser beam irradiators.

Here, the laser beam is irradiated in a central axis direction of the water pump to perform the fusion, or as shown in FIG. 11, the laser beam may be irradiated to be inclined with respect to a central axis to perform the fusion. An angle at which the laser beam is irradiated obliquely may be an acute angle with respect to the central axis of the water pump, and in some cases, the fusion may be performed while the laser beam is irradiated in a direction perpendicular to the central axis, that is, in the radial direction. The fusion may also be performed in various other ways.

As set forth above, according to the water pump of the present disclosure and the manufacturing method thereof, it is possible to ensure the reliable airtightness at the coupling portion when the upper casing, the lower casing, and the motor housing are assembled and coupled with one another.

An inventor or joint inventor of the present application has made a prior disclosure via Korean Patent Application No. 10-2386993.

In addition, the three parts may be fusion-coupled with each other simultaneously, and the water pump may thus be easily manufactured at a lower manufacturing cost.

The present disclosure is not limited to the above-described embodiments, and may be variously applied. In addition, the present disclosure may be variously modified by those skilled in the art to which the present disclosure pertains without departing from the gist of the present disclosure claimed in the claims.

What is claimed is:

1. A water pump comprising:
   a motor housing having a shape of a container with an open upper side;
   a lower casing disposed on the upper side of the motor housing, and including a rotor accommodating part that protrudes downward and has a rotor accommodating space concave downward from an upper surface thereof, and a first side wall protruding downward along a circumference thereof for a lower end of the first side wall to be in contact with an upper end of the motor housing; and
   an upper casing disposed on an upper side of the lower casing to be fitted to the outside of the lower casing, having an impeller accommodating space formed therein together with the lower casing, and including a second side wall protruding downward along a circumference thereof for a lower end of the second side wall to be in contact with the upper end of the motor housing,
      wherein the upper end of the motor housing, the lower end of the first side wall, and the lower end of the second side wall are fusion-coupled with one another,
   the motor housing has a concave insertion groove positioned along a circumference of the upper end,
   the lower end of the first side wall and the lower end of the second side wall are inserted into the insertion groove,
   the motor housing is made of a laser-transmitting material,
   the lower casing or the upper casing is made of a laser-absorbing material, and
   the part where the insertion groove, the first side wall, and the second side wall are all adjacent to one another is fused to form a fused part.

2. The pump of claim 1, wherein a lower surface of the first side wall and a lower surface of the second side wall are in contact with a bottom surface of the insertion groove.

3. The pump of claim 1, wherein a predetermined gap exists between the first side wall and the insertion groove, or between the second side wall and the insertion groove, in the radial direction.

4. The pump of claim 1, wherein a lower surface of the second side wall is disposed higher than a lower surface of the first side wall in a central axis direction, the lower end of the second side wall is disposed adjacent to the first side wall, and the insertion groove has a shape corresponding to those of the lower end of the first side wall and the lower end of the second side wall.

5. The pump of claim 4, wherein the lower surface of the second side wall is in contact with a bottom surface of the insertion groove.

6. The pump of claim 4, wherein the lower surface of the second side wall is inclined outward and upward in a radial direction.

7. The pump of claim 2, wherein the lower end of the first side wall, the lower end of the second side wall, and the bottom surface of the insertion groove are all fusion-coupled with one another at their adjacent portions.

8. The pump of claim 1, further comprising:
   a stator positioned in the motor housing;
   an impeller rotatably positioned in the impeller accommodating space; and
   a rotor rotatably positioned in the rotor accommodating space of the lower casing and coupled to the impeller to be rotated together.

9. A manufacturing method of the water pump of claim 8, comprising:
   a part preparation operation of manufacturing the motor housing with a laser-transmitting material, and manufacturing the lower casing and the upper casing with a laser-absorbing material;
   a part assembly operation of assembling the motor housing, the stator, the lower casing, the rotor, the impeller, and the upper casing with one another; and
   a laser fusion operation of irradiating a laser beam to the first side wall and the second side wall for the laser beam to pass through the insertion groove, thereby fusion-coupling the motor housing, the first side wall, and the second side wall with one another,
   wherein in the laser fusion operation,
      a laser beam is irradiated to the part where the first side wall, the second side wall, and the insertion groove are all adjacent to one another, and the first side wall, the second side wall, and the insertion groove are all fused with one another.

10. The method of claim 9, wherein the first side wall, the second side wall, and the insertion groove of the motor housing are coupled with one another simultaneously by the laser fusion.

11. The method of claim 10, wherein the lower end of the first side wall, the lower end of the second side wall, and an upper surface of the motor housing are all fusion-coupled with one another at their adjacent portions.

12. The method of claim 9, wherein in the laser fusion operation, the laser beam is irradiated in a central axis direction or to be inclined with respect to a central axis.

* * * * *